United States Patent
Lim et al.

(10) Patent No.: US 10,164,443 B2
(45) Date of Patent: Dec. 25, 2018

(54) METHOD OF CONTROLLING FREQUENCY OF POWER SYSTEM

(71) Applicant: KOREA ELECTRIC POWER CORPORATION, Naju-si, Jeollanam-do (KR)

(72) Inventors: Geon Pyo Lim, Daejeon (KR); Soo Yeol Kim, Daejeon (KR); Chan Wook Park, Daejeon (KR); Yo Han Choi, Daejeon (KR); Seung Han Kim, Daejeon (KR); Doo Yong Park, Daejeon (KR); Yong Beum Yoon, Daejeon (KR)

(73) Assignee: KOREA ELECTRIC POWER CORPORATION, Naju-Si, Jeollanam-Do (KR)

( * ) Notice: Subject to any disclaimer, the term of this patent is extended or adjusted under 35 U.S.C. 154(b) by 60 days.

(21) Appl. No.: 15/346,288

(22) Filed: Nov. 8, 2016

(65) Prior Publication Data
US 2018/0131199 A1    May 10, 2018

(51) Int. Cl.
H02J 7/00    (2006.01)

(52) U.S. Cl.
CPC ............ *H02J 7/0021* (2013.01); *H02J 7/007* (2013.01)

(58) Field of Classification Search
CPC ................................ H02J 7/0021; H02J 7/007
USPC .......................................................... 320/134
See application file for complete search history.

(56) References Cited

U.S. PATENT DOCUMENTS

| 7,925,597 B2* | 4/2011 | Takano | G06Q 50/06 700/286 |
| 8,907,636 B2* | 12/2014 | Li | H02P 9/04 290/44 |
| 2011/0087337 A1* | 4/2011 | Forsell | A61B 17/12 623/23.68 |

FOREIGN PATENT DOCUMENTS

KR    10-2015-0089273 A    8/2015

* cited by examiner

*Primary Examiner* — M'Baye Diao
(74) *Attorney, Agent, or Firm* — McDermott Will & Emery LLP

(57) ABSTRACT

Disclosed is a method of controlling frequency of a power system by which a frequency of a power system is regulated using high-speed charging and discharging characteristics of a plurality of energy storage systems (ESSs) and a battery state of charge (SOC), the method including: an operation of comparing, by a control unit, first time information and second time information and performing an exit control mode when the first time information (Before_Exit_time) is equal to or less than the second time information (After_Exit_time); an operation of determining, the control unit, an output amount for each ESS for discharging batteries using a battery discharging amount determining function (Exit_control_output( ) function) when a first parameter value (D_time) preset in the exit control mode is a positive value greater than zero and the second time information (After_Exit_time) is equal to or less than a second parameter value (Clear_time); and an operation of discharging, by the control unit, batteries until the frequency is out of a normal range, when an allocated amount of output for each ESS is calculated.

8 Claims, 5 Drawing Sheets

METHOD OF CONTROLLING FREQUENCY OF POWER SYSTEM

BACKGROUND

1. Field of the Invention

The present invention relates to a method of controlling a frequency of a power system, and more particularly, to a method of controlling frequency of a power system capable of stably regulating a frequency of a power system using high-speed charging and discharging characteristics of a plurality of energy storage systems (ESSs) and a battery state of charge (SOC).

2. Discussion of Related Art

FIG. 1 is an example view schematically illustrating a conventional thermal power plant system.

As illustrated in FIG. 1, the power plant includes three parts which are a boiler, a turbine, and a generator, and a power transmission system is connected to a power grid system.

Here, a generator system, a turbine system, a water circulation system, and a condenser system of a steam condenser and feedwater system are the main facilities for a generator and a turbine, and the remaining part is a boiler system.

The boiler system includes a facility system for supplying water, fueling and ventilating to heat the water, and a plurality of other facility systems for discharging and processing the water out of the boiler.

The boiler produces steam out of the water using fuel and air and send the steam to the turbine system, and the turbine connected to a generator regulates amount of the steam being introduced using a valve to regulate a mechanical force due to the steam, for maintaining 60 Hz of the power system.

A deviation occurs in the generator from revolutions corresponding to 60 Hz due to a difference between a power load required by the system and an amount of power produced by the generator, and the revolution of the generator is regulated by the turbine using the steam.

Although the turbine attempts to open and close the valve to control an amount of steam for maintaining a turbine speed, the boiler formed with many facilities as illustrated in FIG. 1 requires a certain amount of time until achieving combustion for producing steam from supplying water, ventilating, and fueling and additionally requires a certain amount of time after combustion until the boiler produces and supplies steam at a temperature and pressure required by the turbine.

Meanwhile, frequency regulation may be classified as a primary control which is a frequency follow-up control in which a generator governor (a device which can react to a load variation with constant synchronous speed) immediately reacts to frequency variations or a secondary control in which output and frequency of the generator is controlled by receiving output instructions from a power exchange authority.

In addition, although a momentary demand for the steam may be controlled by the steam being supplied from the boiler to the turbine, a time delay for producing and supplying the steam occurs when a larger amount of the steam is demanded because, due to the steam supplied from the boiler to the turbine having a time delay, the steam is not sufficiently and immediately supplied to the turbine even after opening a steam valve.

Therefore, a time delay occurs for the boiler to combust fuel, evaporate water, and produce and supply the steam needed by the turbine. Due to the time delay, there arises a problem in which the frequency is not immediately recovered to 60 Hz but converged to 60 Hz having a time delay depending on how much power the generator supplies and how quickly the power is supplied.

Description of the related art of the present invention is disclosed in Korean Patent Laid-open Publication 10-2015-0089273 (published on Aug. 5, 2015, and entitled method for controlling charging and discharging of battery energy storage system and the same).

SUMMARY OF THE INVENTION

The present invention is directed to providing a method of controlling frequency of a power system capable of stably regulating a frequency of a power system using high-speed charging and discharging characteristics of an energy storage system (ESS) and a state of charge (SOC).

The present invention is also directed to providing a method of controlling frequency of a power system capable of reacting to frequency variations of a power system at the highest speed possible while consistently maintaining an optimal SOC for optimally maintaining lifetime of an energy storage system (ESS).

According to an aspect of the present invention, there is provided a method of controlling a frequency of a power system by which the frequency of the power system is regulated using high-speed charging and discharging characteristics of a plurality of energy storage systems (ESSs) and a battery state of charge (SOC), the method including: comparing, by a control unit, first time information and second time information and performing an exit control mode when the first time information (Before_Exit_time) is equal to or less than the second time information (After_Exit_time); determining, by the control unit, an output amount for each ESS for discharging batteries using a battery discharging amount determining function (Exit_control_output( ) function) when a first parameter value (D_time) preset in the exit control mode is a positive value greater than zero and the second time information (After_Exit_time) is equal to or less than a second parameter value (Clear_time); and discharging, by the control unit, batteries until the frequency reaches a normal range when an allocated amount of output for each ESS is calculated.

The first time information (Before_Exit_time) may be updated information of time from passing out of a transient state until satisfying a requirement of an exit state serving as a record of operation time of the exit control mode, and the second time information (After_Exit_time) may be time information recorded after an operation of the exit control mode.

The control unit may perform a transient control mode when the first time information (Before_Exit_time) is greater than the second time information (After_Exit_time).

The battery discharging amount determining function (Exit_control_output( ) function) may be a function which determines battery discharging amount of the ESS in the exit control mode, the first parameter value (D_time) may be time for satisfying a requirement of a transient state, and the second parameter value (Clear_time) may be finish time of the exit control mode.

The control unit may perform a transient control mode when the first parameter value (D_time) is greater than zero while the first time information (Before_Exit_time) is greater than the second time information (After_Exit_time) and may perform a normal control mode when the first parameter value (D_time) is not greater than zero while the first time information (Before_Exit_time) is greater than the second time information (After_Exit_time).

When the first parameter value (D_time) is greater than zero and the frequency is 60 Hz or less, the control unit may determine output by calculating a charging amount and discharging amount corresponding to an amount of power remaining in the batteries of the ESS using a participation rate determining function when discharging (SOC_discharge_proportion( ) function), a participation rate determining function when charging (SOC_charge_proportion( ) function), a discharging power calculation function according to the participation rate (P_distribute_discharge( ) function), and a function determining whether to output the discharging power (Dynamic_control_output( ) function).

When the first parameter value (D_time) is not greater than zero in performing the transient control mode, the control unit may perform a normal control mode and may perform discharging of the allocated amount of output for each ESS calculated using the discharging power calculation function according to the participation rate (P_distribute_discharge( ) function) and an allocated output amount calculation function in a steady state (Normal_control_output( ) function).

When the frequency is in the normal range and the discharge is finished, the control unit may store an SOC state information calculated using an SOC integration function (SOC_calculation( ) function) for reusing the SOC state information at next frequency control which is periodically performed.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
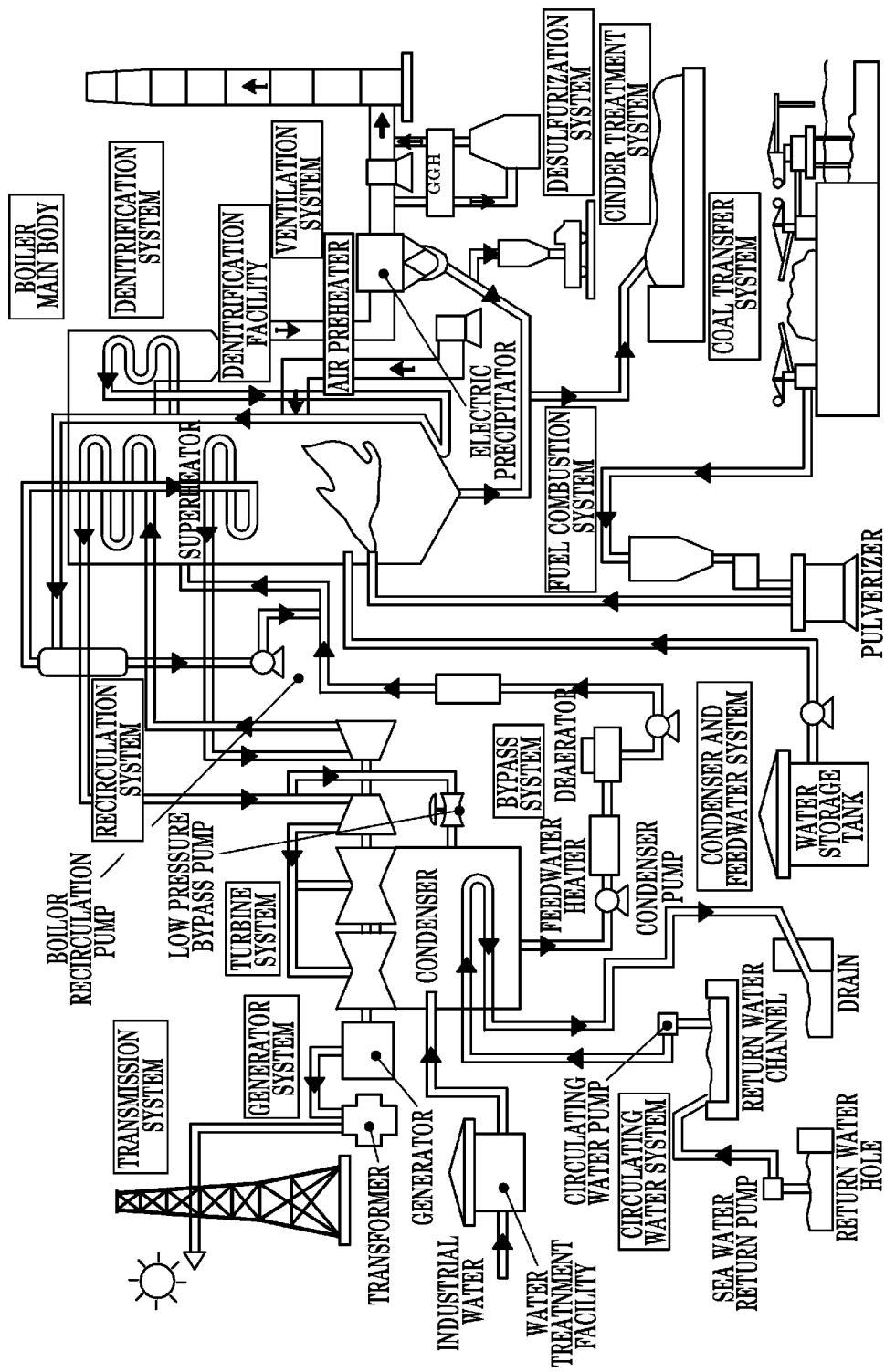
FIG. 1 is an example view schematically illustrating a conventional thermal power plant system.

Hereinafter, one embodiment of a method of controlling frequency of a power system according to the present invention will be described with reference to accompanying drawings.

In the process of describing, thicknesses of lines and sizes of components illustrated may be somewhat exaggerated in the drawings for the sake of clarity and convenience of descriptions. In addition, terms described below are defined considering functions of the present invention, but the terms may be changed by intention or practice of users and operators. Thus, definitions of these terms should to be made on the basis of the content throughout the specification.

The present invention relates to performing control of maintaining an optimal state of charge (SOC) for optimally maintaining a battery lifetime while consistently reacting to frequency variations to perform a primary control of a frequency, performing fully integrated control over control systems to each of which controllable certain scale of energy storage systems (ESSs) are assigned due to a limit in performance of a control system which has to process high-speed input/output data, and making the best use of frequency regulating performance by high-speed charging and discharging control of a control system to which controllable certain scale of the ESSs are assigned.

Figure 2:
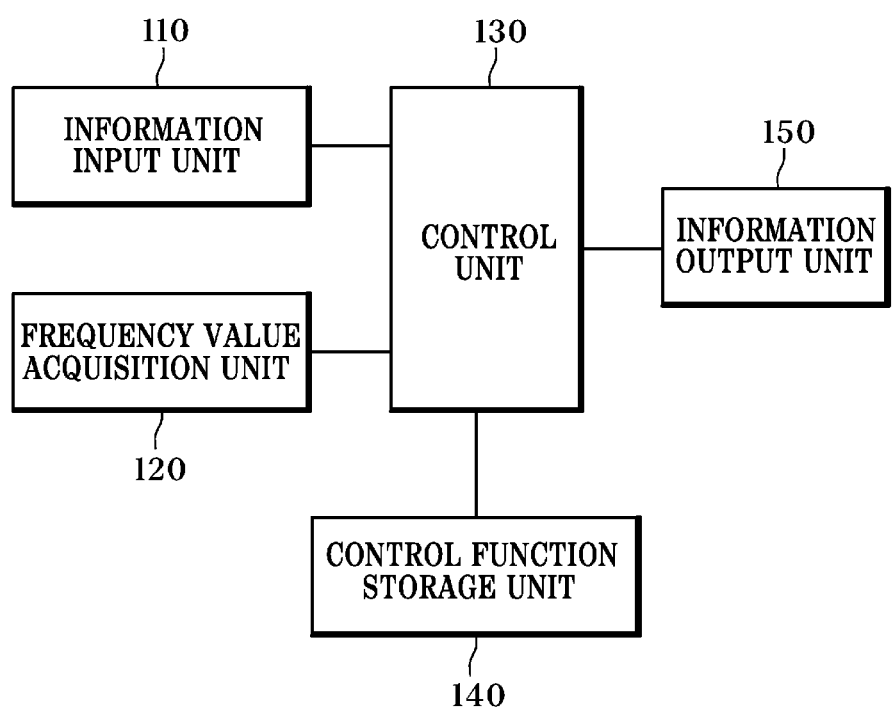
FIG. 2 is an example view illustrating a schematic configuration of a device for controlling a frequency of a power system according to one embodiment of the present invention.

FIG. 2 is an example view illustrating a schematic configuration of a device for controlling a frequency of a power system according to one embodiment of the present invention.

As illustrated in FIG. 2, the device for controlling a frequency of a power system according to the present embodiment includes an information input unit 110, a frequency value acquisition unit 120, a control unit 130, a control function storage unit 140, and an information output unit 150.

The information input unit 110 receives data of various variables including a frequency and a battery SOC of the ESSs.

The frequency value acquisition unit 120 acquires frequency values at intervals of a certain step (for example, 0.02 step, 0.20 step, etc.) from a current point.

The control unit 130 is performed by classifying functional states of the ESSs into a steady state, a transient state, and an exit state which is returning from the transient state to the steady state.

The control function storage unit 140 stores at least one control function related to a calculation for controlling the ESSs.

The control function storage unit 140 stores at least a P_response( ) function, a P_requirement( ) function, a Dynamic_indicator( ) function, a Normal_indicator( ) function, a Num_available_ESS( ) function, an SOC_discharge_proportion( ) function, and an SOC_charge_proportion( ) function.

Here, values of variables used in functions are defined in the parenthesis "()" but will be omitted in the present embodiment for convenience.

The P_response( ) function calculates a full output demand on the ESSs for a steady state frequency.

The P_requirement( ) function calculates a full output demand on the ESSs for a dynamic state frequency.

The Dynamic_indicator( ) function calculates whether to perform a dynamic state calculation for the ESSs according to determining criteria of a dynamic control mode.

The Normal_indicator( ) function calculates whether to switch from the dynamic state to the steady state according to determining criteria of an exit control mode.

The control unit 130 arranges the ESSs in order from the highest SOC to calculate available number of the ESSs according to the SOC.

The Num_available_ESS( ) function calculates available number of the ESSs according to the SOC of the ESSs.

The SOC_discharge_proportion( ) function calculates a discharge rate for proportional allocation according to the SOC of the ESSs.

The SOC_charge_proportion( ) function calculates a charging rate for proportional allocation according to the SOC of the ESSs.

Besides the above, the control function storage unit 140 may further include a variable setting function for distinguishing control modes, an output initial value (D_time, N_time) setting function at the time of the exit control mode, and a control variable initializing (N_time) function after finishing the exit control mode.

In addition, the information output unit 150 outputs a calculation result values for controlling the ESSs.

Hereinafter, an operation of the device for controlling a frequency of a power system configured as above will be described with reference to flowcharts of FIGS. 3 and 4.

Figure 3:
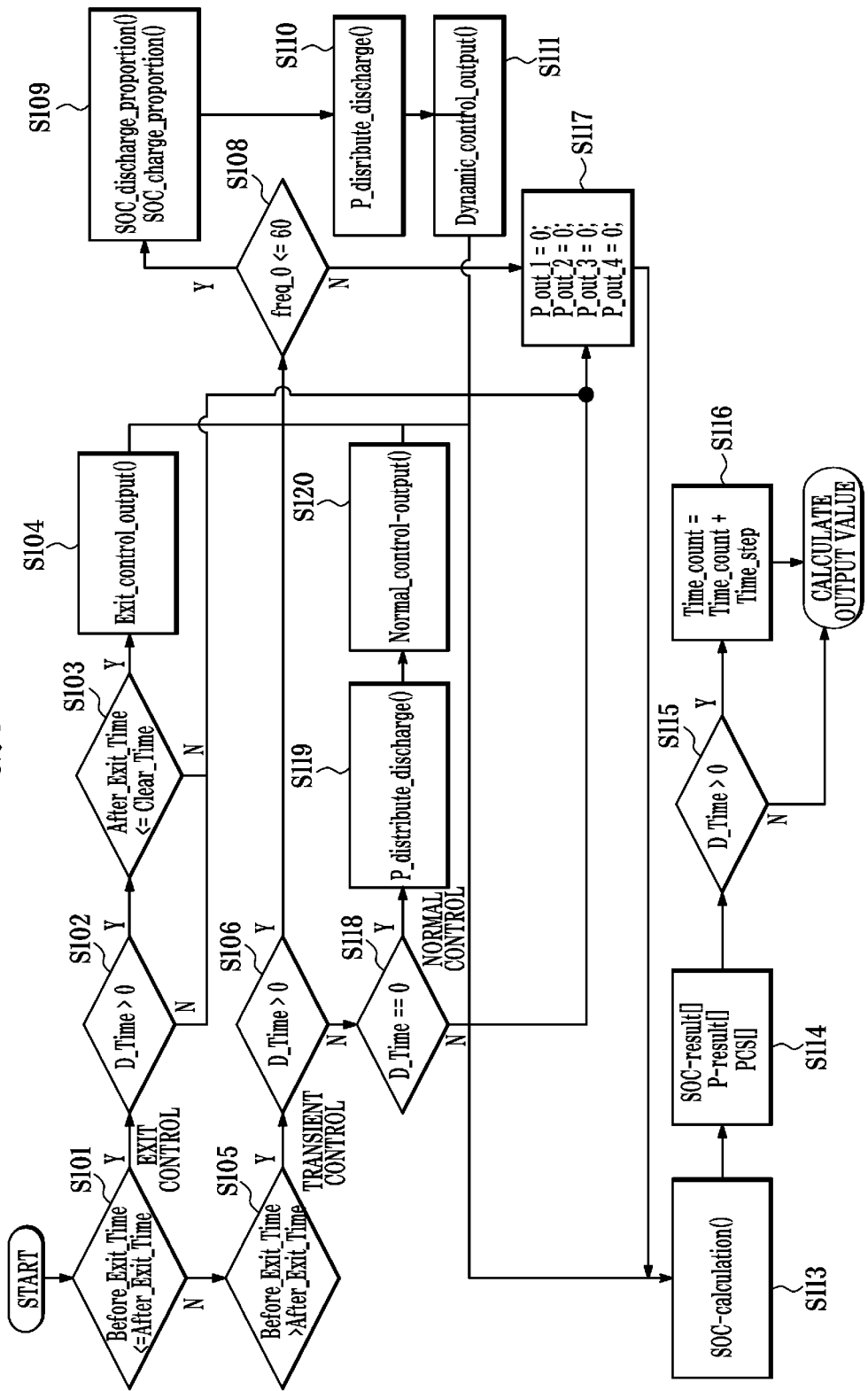
FIG. 3 is a flowchart for describing a method of calculating an output value according to each control mode when controlling a frequency of a power system according to one embodiment of the present invention.

FIG. 3 is a flowchart for describing a method of calculating an output value according to each control mode when controlling a frequency of a power system according to one embodiment of the present invention, and more particularly, a flowchart for describing a method of calculating an output value according to each control mode (for example, the exit control mode, a transient control mode) of the ESSs.

Referring to FIG. 3, the control unit 130 compares two different times of Before_Exit_time and After_Exit_time and thereby performs an exit control or a transient control.

Here, Before_Exit_time is updated information of time from passing out of the transient state until satisfying a requirement of the exit state. That is, Before_Exit_time is a record of operation time of the exit control mode. In addition, the After_Exit_time is time information recorded after the operation of the exit control mode.

First, the control unit 130 performs the exit control mode when Before_Exit_time is equal to or less than After_Exit_time (S101).

Conversely, the control unit 130 performs the transient control mode (Yes of S105) when Before_Exit_time is greater than After_Exit_time (No of S101).

In the exit control mode, the control unit 130 performs an Exit_control_output( ) function (S104) when D_time is a positive value greater than zero and After_Exit_time is equal to or less than Clear_time (Yes of S103).

According to a control strategy of the ESS, an output value is determined by the Exit_control_output( ) function. The Exit_control_output( ) function is a function which determines battery discharging amount of the ESS in the exit control mode.

Here, D_time represents time for satisfying a requirement of the transient state, N_time represents time for satisfying a requirement of the exit state, Clear_time represents finishing time of the exit control mode, and when reaching the exit control mode ending time, the parameter values (D_time, N_time, Clear_time, Before_Exit_time, and After_Exit_time) used for determining a control mode (for example: the exit control mode, the transient control mode) are initialized.

Meanwhile, after passing a state in which Before_Exit_time is greater than After_Exit_time (No of S101 and Yes of S105), the control unit 130 performs the transient control mode (Yes of S106) when D_time is greater than zero and performs a normal control mode (Yes of S118) when D_time is not greater than zero (No of S106).

That is, after entering the transient control mode, when D_time is greater than zero (Yes of S106) and the frequency is 60 Hz or less (Yes of S108), the control unit 130 performs the SOC_discharge_proportion( ) function and the SOC_charge_proportion( ) function (S109). In addition, the control unit 130 performs a P_distribute_discharge( ) function (S110), and then performs a Dynamic_control_output( ) function (S111).

Charging or discharging capacity depends on an amount of power currently remaining in a battery, and, thereby, how much to charge or discharge is determined.

Here, the SOC_discharge_proportion( ) function determines a participation rate of each ESS depending on the SOC capacity when discharging, the SOC_charge_proportion( ) function determines a participation rate of each ESS depending on the SOC capacity when charging, and the P_distribute_discharge( ) calculates discharging power according to the participation rate calculated as above.

In addition, the Dynamic_control_output( ) function configured to determine whether to output the discharging power of the ESS determines to output the discharging power of the ESS when the frequency is 60 Hz or less or when the SOC is between the minimum and the maximum of a preset range. That is, the control unit 130 calculates the participation rate of each ESS within an available SOC range of the ESS (that is, between the minimum and maximum of the preset range), calculates an allocated amount of output for each ESS and performs discharging of batteries until the frequency is out of a normal range (that is, the discharging of batteries is continually performed when the frequency is out of the normal range.)

Meanwhile, after the control unit 130 enters the transient control mode, when D_time is not greater than zero (No of S106), the control unit 130 performs the normal control mode (Yes of S118) to perform a P-distribute_discharge( ) function (S119) and a Normal_control_output( ) function (S120) in succession. That is, the allocated amount of output is discharged by calculating a steady state output value using the calculation functions.

Next, after the frequency (freq_0) is in the normal range (No of S108), the output value of each ESS (P_out_1, P_out_2, P_out_3, or P_out_4) is initialized to zero (S117).

After this, the control unit 130 stores an SOC state information calculated by an SOC integration function (SOC_calculation( ) function) (S113) to reuse the SOC state information at next cycle (S114) because the above-described calculation process is repeatedly performed with a constant cycle (for example, 20 ms).

After this, when D_time continues to be greater than zero (Yes of S115), the control unit 130 increases a time_count value to maintain the frequency level (S116). This process may be repeatedly performed.

Meanwhile, when D_time is zero or less (No of S115), the control unit 130 calculates an output value and stops the operation.

Figure 4:
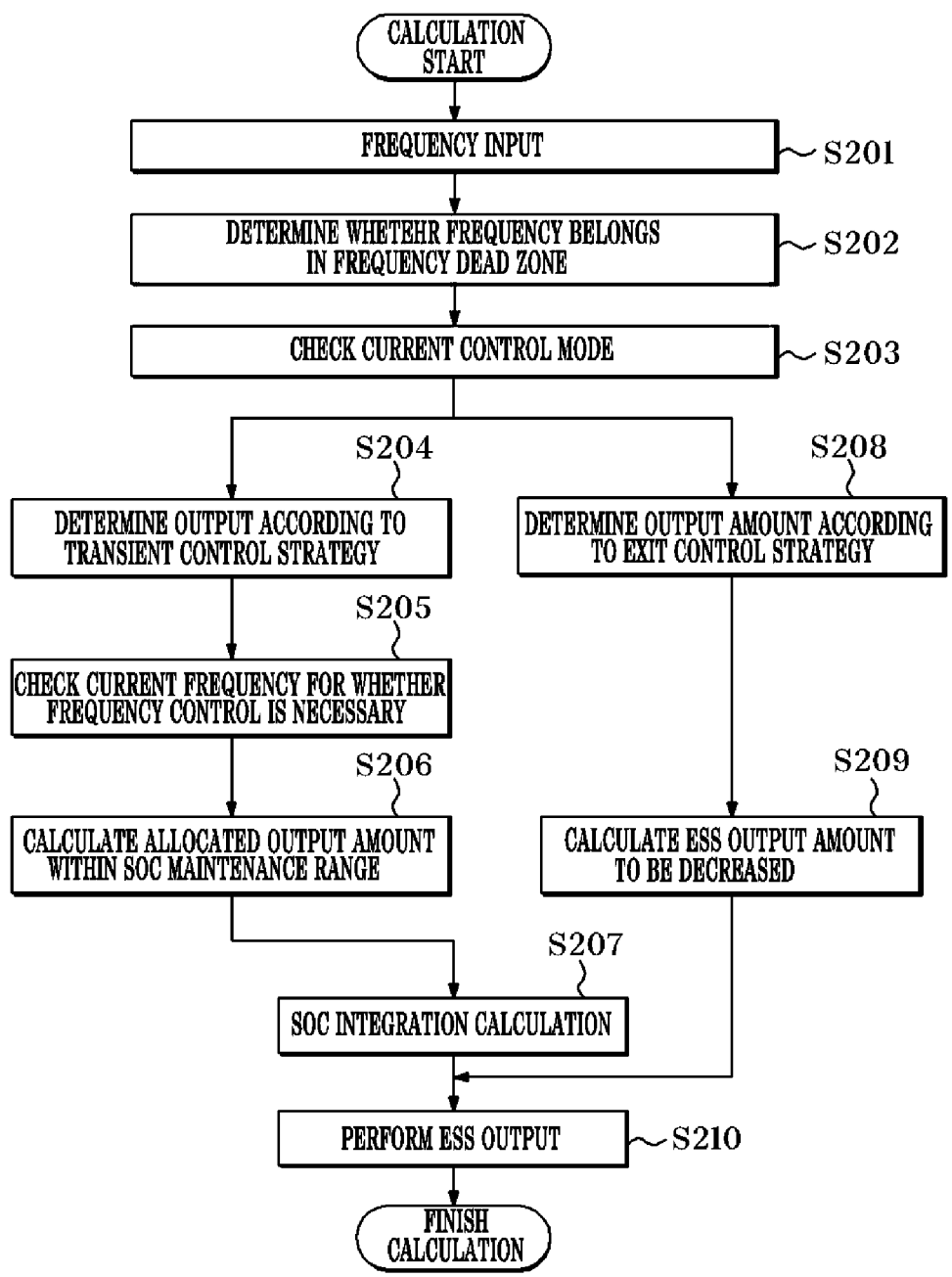
FIG. 4 is a flowchart for describing a method of controlling frequency of a power system according to one embodiment of the present invention.

FIG. 4 is a flowchart for describing a method of controlling frequency of a power system according to one embodiment of the present invention, and more particularly, a flowchart for describing a process of mutually linking the methods of calculating output amounts by each operation process performed in primary control of the ESS.

An output amount determining function by each control mode, that is, a function for determining the output amount of the ESS performs calculations every time a frequency is input.

When a frequency is input (S201), the control unit 130 determines whether the frequency belongs to a frequency dead zone (S202) and checks the present control mode of the ESS (S203).

Here, the frequency dead zone is a frequency domain for preventing the ESS from frequently responding according to frequency changes, for example, frequent charging and discharging of the ESS according to a small frequency change is reduced by setting the frequency dead zone between a certain upper and lower range with respect to 60 Hz, to which the ESS does not respond.

When the current control mode of the ESS checked at the operation S203 is the exit control mode, the control unit 130 determines the output of the ESS according to an exit control strategy (S208). That is, during the time of performing the exit control according to the exit control strategy, the control unit 130 decreases the output of the ESS (S209) by calculating an output amount of the ESS to be decreased according to a ratio preset by a user.

When the current control mode of the ESS checked at the operation S203 is the transient control mode, the control unit 130 determines the output of the ESS according to a transient control strategy (S204). That is, in the transient control mode, current frequency is checked whether to be in a frequency range for which frequency control is necessary (S205).

When the current frequency checked at the operation 205 is within the range for which frequency control is necessary, an allocated amount of output for each ESS is calculated (S206) by determining available SOC capacity of the ESSs within the minimum and maximum SOC maintenance range of each ESS and considering the participation rate of each ESS.

After the allocated amount of output within the SOC maintenance range is calculated at operation S206, an SOC integral is calculated by the SOC integration function (S207), and then final ESS output is performed according to the SOC integration (S210).

Figure 5:
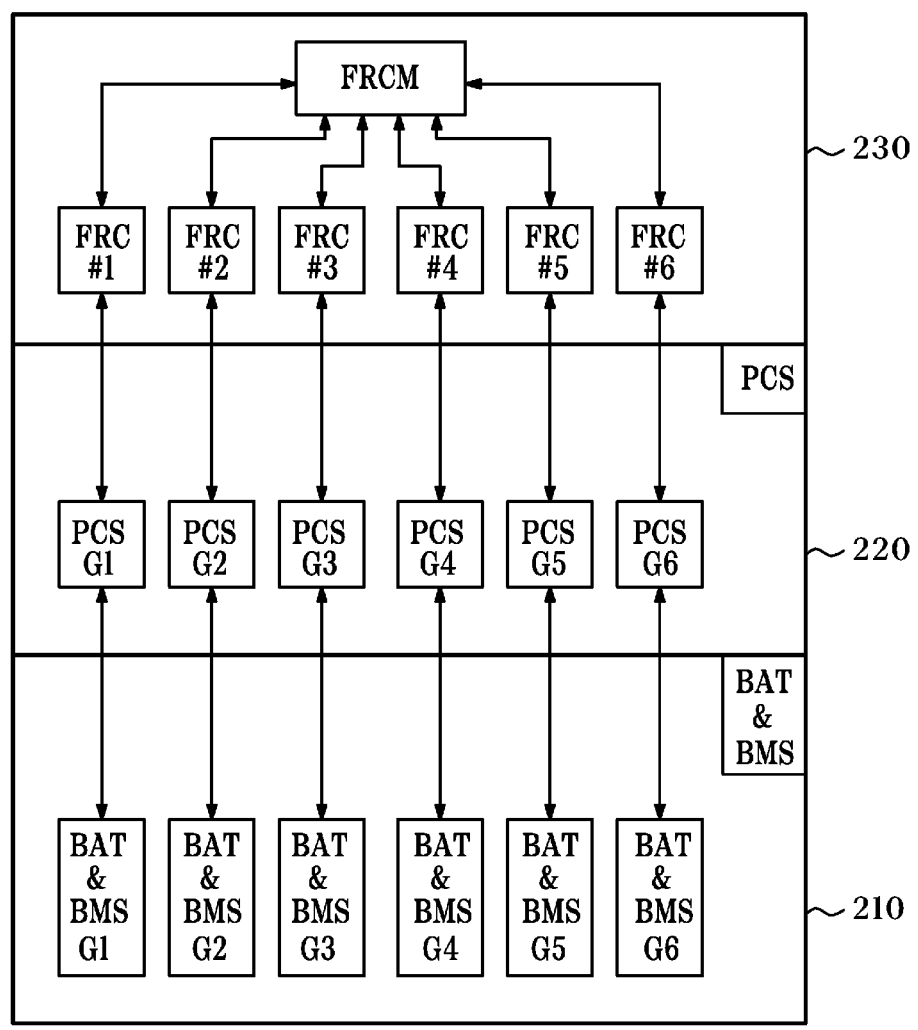
FIG. 5 is an example view illustrating a schematic configuration of a battery energy storage system associated with one embodiment of the present invention.

FIG. 5 is an example view illustrating a schematic configuration of a battery ESS associated with one embodiment of the present invention.

The present embodiment is performed at frequency regulation controllers (FRCs) of FIG. 5, for example, FRC#1 to FRC#6.

Capacities of the FRCs (for example, FRC#1 to FRC#6) are determined by power conditioning system groups (PCS G) 220 (for example, PCS G1 to PCS G6) and battery and battery monitoring systems (BAT& BMSs) 210 (for example, BAT&BMS G1 to BAT&BMS G6), which are linked according to an amount of input/output data available for processing.

Accordingly, a plurality of FRCs are linked to configure the battery ESS when the system is for high-capacity, and a higher level controller capable of performing integrated control becomes necessary because a charging amount and a state of operation availability by FRC are different for each in the system with multiple FRCs. Such a control system which performs an integrated control function is a frequency regulation controller master (FRCM).

In the present embodiment, a concept including all of the FRCM and the FRCs (for example, FRC#1 to FRC#6) is referred to as a control system 230 (or a control unit). Therefore, the control unit 130 of FIG. 1 and the control unit 230 implemented at an actual system as illustrated in FIG. 5 may actually be considered to be the same concept.

For reference, the control unit 130 or 230 calculates the participation rate of each FRC to maintain balance of the SOC among the batteries.

For example, when the control system 130 or 230 is performing control in a steady state of frequency, the participation rate is 100% when the SOC is within the maintenance range of a battery charging amount, and the participation rate is 0% when the SOC is out of the maintenance range of a battery charging amount.

Meanwhile, when the control system 130 or 230 is performing control in a transient state of frequency, each different participation rate is applied to FRCs depending on battery SOC distribution of the FRCs, and for example, when the absolute value of a charging amount deviation between batteries of all the FRC is 10% or less, the participation rate is determined by a ratio of available capacity of the FRC to available capacity of the whole FRCs available to participate.

In addition, when the absolute value of a charging amount deviation between batteries of all the FRC exceeds 10%, the participation rate is determined by a ratio of available energy of the FRC to available energy of the whole FRCs available to participate. However, an available charging amount for controlling batteries when being controlled in the transient state of frequency is set to be greater than the battery charging amount maintenance range when controlled in the steady state of frequency to increase a contribution rate of the battery ESS to the transient state frequency.

Meanwhile, in the present embodiment, the steady state control mode is applied to a steady state of a power system without a trouble and the control is performed considering the SOC and frequency of the power system. Here, because urgent system control is not necessary in the steady state, response control of the battery ESS needs to be minimized so that an optimal charge capacity for achieving optimal battery lifetime is secured.

In the present embodiment, a discharge limit needs to be set for the ESS because the lifetime of the energy storage system is decreased when the energy storage system is operated at a low SOC. In addition, a frequency dead zone which controls frequency changes needs to be set to prevent the battery lifetime from decreasing due to frequent charging and discharging operations. That is, the frequency dead zone is set because setting the ESS to respond to all the small and fast frequency changes degrades the lifetime and efficiency of the facilities in general. A charging amount is secured by charging a suitable amount that is enough not to be recognized as a disturbance of the power system depending on the SOC.

In addition, the present embodiment is configured to exhibit maximum control of the ESS during a transient state immediately after occurrence of a system trouble.

In addition, in the SOC over the limit of a discharge range, output of the ESS is controlled by applying the system constant K (MW/Hz) of the power system of Korea. The system constant K is a value corresponding to a frequency deviation at the minimum frequency point with respect to an amount of tripped generator when a generator trip has occurred, that is, when a generator is unexpectedly stopped or steady power is not available to be output, in the power system. For example, the system constant K is calculated by calculating a demand on the ESS based on the maximum output amount demanded by the system in proportion to a frequency decline in a domain operable even before reaching the minimum frequency point after occurrence of the system disturbance because characteristics of the ESS allows speedy control during a transient period of the power system. In addition, it is necessary to prevent a drastic output change when the system starts to recover from the transient period to return to the control mode of the steady state.

As described above, in the present embodiment, the method of controlling frequency of the power system has effects of overcoming problems of the time delay and the limit of the batteries in generating continuous output in a power plant by controlling the high-capacity ESS to be maintained with a continuous charging amount for enhancing the available capability thereof while being charged with dump power at the highest speed possible and discharged for power shortage using the high-speed charging and discharging characteristics of the high-capacity ESS.

According to one aspect of the present invention, using the high-speed charging and discharging characteristics of the ESS and the battery SOC thereof, the present invention can stably regulate a frequency of the power system, and can respond and react to a frequency change of the power system at the highest speed possible while consistently maintaining the SOC for optimally maintaining the lifetime of the ESS.

While the present invention has been described in connection with the embodiment illustrated in the drawings, the above-described embodiment should be considered in a descriptive sense only, and it should be obvious to those skilled in the art that various modifications and other equivalent embodiments may be made from the description set forth herein. Accordingly, the scope of the present invention shall be determined only according to the technical sprit of the attached claims.

REFERENCE NUMERALS

110: INFORMATION INPUT UNIT
120: FREQUENCY VALUE ACQUISITION UNIT
130: CONTROL UNIT
140: CONTROL FUNCTION STORAGE UNIT
150: INFORMATION OUTPUT UNIT
210: BAT&BMS (BATTERY AND BATTERY MONITORING SYSTEM)
220: PCS G (POWER CONDITIONING SYSTEM GROUP)
230: CONTROL SYSTEM

What is claimed is:

1. A method of controlling a frequency of a power system by which the frequency of the power system is regulated using high-speed charging and discharging characteristics of a plurality of energy storage systems (ESSs) and a battery state of charge (SOC), the method comprising:
   comparing, by a control unit, first time information (Before_Exit_time) and second time information (After_Exit_time) and performing an exit control mode when the first time information is equal to or less than the second time information;
   determining, by the control unit, an output amount for each ESS for discharging batteries using a battery discharging amount determining function (Exit_control_output( ) function) when a first parameter value (D_time) preset in the exit control mode is a positive value greater than zero and the second time information (After_Exit_time) is equal to or less than a second parameter value (Clear_time); and
   discharging, by the control unit, batteries until the frequency reaches a normal range when an allocated amount of output for each ESS is calculated.

2. The method of claim 1, wherein the first time information (Before_Exit_time) is updated information of time from passing out of a transient state until satisfying a requirement of an exit state serving as a record of operation time of the exit control mode, and the second time information (After_Exit_time) is time information recorded after an operation of the exit control mode.

3. The method of claim 1, wherein the control unit performs a transient control mode when the first time information (Before_Exit_time) is greater than the second time information (After_Exit_time).

4. The method of claim 1, wherein the battery discharging amount determining function (Exit_control_output( ) function) is a function which determines battery discharging amount of the ESS in the exit control mode, the first parameter value (D_time) is time for satisfying a requirement of a transient state, and the second parameter value (Clear_time) is finish time of the exit control mode.

5. The method of claim 1, wherein the control unit performs a transient control mode when the first parameter value (D_time) is greater than zero while the first time information (Before_Exit_time) is greater than the second time information (After_Exit_time) and performs a normal control mode when the first parameter value (D_time) is not greater than zero while the first time information (Before_Exit_time) is greater than the second time information (After_Exit_time).

6. The method of claim 3, wherein, when the first parameter value (D_time) is greater than zero and the frequency is 60 Hz or less, the control unit determines output by calculating a charging amount and discharging amount corresponding to an amount of power remaining in the batteries of the ESS using a participation rate determining function when discharging (SOC_discharge_proportion( ) function), a participation rate determining function when charging (SOC_charge_proportion( ) function), a discharging power calculation function according to the participation rate (P_distribute_discharge( ) function), and a function determining whether to output the discharging power (Dynamic_control_output( ) function).

7. The method of claim 3, wherein, when the first parameter value (D_time) is not greater than zero in performing the transient control mode, the control unit performs a normal control mode and performs discharging of the allocated amount of output for each ESS calculated using a discharging power calculation function according to the participation rate (P_distribute_discharge( ) function) and an allocated output amount calculation function in a steady state (Normal_control_output( ) function).

8. The method of claim 1, wherein, when the frequency is in the normal range and the discharge is finished, the control unit stores an SOC state information calculated using an SOC integration function (SOC_calculation( ) function) for reusing the SOC state information at next frequency control which is periodically performed.

* * * * *